United States Patent
Nagasato et al.

(10) Patent No.: US 9,879,879 B2
(45) Date of Patent: Jan. 30, 2018

(54) COGENERATION SYSTEM AND METHOD FOR CONTROLLING SAME

(75) Inventors: Hiroshi Nagasato, Shiga (JP); Masato Kihara, Shiga (JP); Motomichi Katou, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 365 days.

(21) Appl. No.: 14/356,070

(22) PCT Filed: Jul. 6, 2012

(86) PCT No.: PCT/JP2012/004397
§ 371 (c)(1),
(2), (4) Date: May 2, 2014

(87) PCT Pub. No.: WO2013/069174
PCT Pub. Date: May 16, 2013

(65) Prior Publication Data
US 2014/0305386 A1    Oct. 16, 2014

(30) Foreign Application Priority Data
Nov. 9, 2011    (JP) ................................ 2011-245137

(51) Int. Cl.
F24H 1/00      (2006.01)
H01M 8/04955   (2016.01)
(Continued)

(52) U.S. Cl.
CPC ............. *F24H 1/00* (2013.01); *F24D 17/001* (2013.01); *F24D 19/1063* (2013.01);
(Continued)

(58) Field of Classification Search
None
See application file for complete search history.

(56) References Cited

U.S. PATENT DOCUMENTS 5,969,435 A * 10/1999 Wilhelm ................... H02J 1/06
307/64
2003/0125843 A1* 7/2003 Prasad ................... G06Q 10/06
700/291
(Continued)

FOREIGN PATENT DOCUMENTS

JP    2000-088482 A    3/2000
JP    2004-068710 A    3/2004
(Continued)

OTHER PUBLICATIONS

Extended European Search Report issued in European Patent Application No. 12848081.1 dated Apr. 17, 2015.
(Continued)

*Primary Examiner* — Alissa Tompkins
*Assistant Examiner* — John Bargero
(74) *Attorney, Agent, or Firm* — McDermott Will & Emery LLP

(57) ABSTRACT

The cogeneration system includes: a cogeneration apparatus which generates electric power using supplied fuel gas and supplies the electric power and heat; a heat accumulator which accumulates the heat supplied by the cogeneration apparatus; a controller which controls at least start and stop of the cogeneration apparatus; and a display unit that displays a remaining power generation duration which is a length of time for which the cogeneration apparatus can continue power generation. The controller further calculates the remaining power generation duration based on a remaining heat accumulation capacity which is a difference between (a) a maximum accumulable heat amount which is the amount of heat the heat accumulator is capable of accumulating and (b) a current accumulated heat amount that is the amount of heat currently accumulated in the heat
(Continued)

accumulator, and causes the display unit to display the calculated remaining power generation duration.

11 Claims, 7 Drawing Sheets

(51) Int. Cl.
*H01M 8/02* (2016.01)
*F24D 17/00* (2006.01)
*F24D 19/10* (2006.01)
*H01M 8/04537* (2016.01)
*H01M 8/04029* (2016.01)
*H01M 16/00* (2006.01)

(52) U.S. Cl.
CPC ......... *H01M 8/02* (2013.01); *H01M 8/04955* (2013.01); *F24D 2200/19* (2013.01); *H01M 8/04029* (2013.01); *H01M 8/04604* (2013.01); *H01M 16/006* (2013.01); *H01M 2220/10* (2013.01); *H01M 2250/10* (2013.01); *H01M 2250/405* (2013.01); *Y02B 90/14* (2013.01); *Y02B 90/16* (2013.01); *Y02E 20/14* (2013.01)

(56) References Cited

U.S. PATENT DOCUMENTS

| 2005/0061003 A1* | 3/2005 | Miyauchi | F24D 11/005 60/691 |
| 2006/0051633 A1* | 3/2006 | Tanaka | H01M 8/04223 429/429 |
| 2006/0092588 A1* | 5/2006 | Realmuto | H02J 1/10 361/62 |

FOREIGN PATENT DOCUMENTS

| JP | 2006-266579 A | 10/2006 |
| JP | 2008-022650 A | 1/2008 |
| JP | 2011-050131 A | 3/2011 |
| JP | 2011-153741 A | 8/2011 |

OTHER PUBLICATIONS

International Search Report issued in International Application No. PCT/JP2012/004397 dated Aug. 7, 2012, with English Translation.

* cited by examiner

FIG. 10

$$\text{Remaining power generation duration} = \frac{\overbrace{\text{Maximum accumulable heat amount} - \text{Current accumulated heat amount}}^{\text{Remaining heat accumulation capacity}} + \text{Estimated heat load}}{\text{Heat supply rate}}$$

Heat supply rate = Current electric power generated by cogeneration apparatus / Estimated electric power load

COGENERATION SYSTEM AND METHOD FOR CONTROLLING SAME

RELATED APPLICATIONS

This application is the U.S. National Phase under 35 U.S.C. § 371 of International Application No. PCT/JP2012/004397, filed on Jul. 6, 2012, which claims priority of Japanese Patent Application No. 2011-245137, filed on Nov. 9, 2011, the contents of each of which are hereby incorporated by reference.

TECHNICAL FIELD

The present invention relates to cogeneration systems which supply at least electric power and heat, and particularly to a cogeneration system which prompts users to prepare for a failure of supply of electric power during independent operation.

BACKGROUND ART

Fuel cells are capable of highly efficient microgeneration, and thereby enable easy building of a system which utilizes thermal energy generated in power generation. Thus, recent years have seen more and more fuel cells used for home cogeneration systems to achieve high-energy efficiency. The cogeneration system is a type of on-site electric power supply system as exemplified by a photovoltaic system, and supplies electric power in connection with a system power supply operated by an electric company. When in-home electric power load is within the supplying capability of a cogeneration system, all electric power for the electric power load is supplied by the cogeneration system. When in-home electric power load exceeds the supplying capability, the system power supply covers the deficiency. The cogeneration system generally has a display unit which displays a current electric power generated by the cogeneration system and electric power purchased from the system power supply so that the users can know contribution of the cogeneration system.

It is technically possible for the on-site electric power supply to supply electric power independently of the system power supply. It is thus desired that the on-site electric power supply independently operate as an emergency power supply when a power failure occurs due to a disaster or deficiency in supply capability of an electric utility. When an on-site electric power supply connected to a system power supply is used as an emergency power supply, the on-site electric power supply generally needs to be parallel off the system power supply and turned off upon detection of failure of the system power supply so that the safety of the network of the system power supply can be secured. On the other hand, the fuel cell needs to be supplied with electric power to activate the fuel cell before starting power generation so that the fuel cell is heated to a predetermined temperature and a pump to fuel the fuel cell is turned on.

There is proposed an independent operation support device which allows an on-site electric power supply system such as a fuel cell system to operate independently. For example, in the event of a power failure, such an independent operation support device connects only between an on-site electric power supply and an in-home electric power load, and supplies electric power required for activation of the on-site electric power supply (see Patent Literature (PTL) 1).

CITATION LIST

Patent Literature

[PTL 1] Japanese Unexamined Patent Application Publication No. 2008-22650

SUMMARY OF INVENTION

Technical Problem

It is necessary for cogeneration systems, such as the fuel cell system, to temporarily accumulate heat generated concurrently with power generation. This is because demand for electric power and demand for hot water in a house are not synchronous. Thus, currently popular in-home cogeneration systems generally accumulate exhaust heat generated in power generation is stored in a water tank as water heated by heat exchange and supply users with the heated water from the water tank for uses such as bathing, face-washing, and meal preparation. In this usage, when the water tank is full of high-temperature water, the water can absorb no more heat exhausted in power generation by the cogeneration system, and thus the cogeneration system can no longer continue power generation. The cogeneration system then stops supplying of electric power.

In normal operation, since the cogeneration system is connected to a system power supply, electric power is continuously supplied to an electric power load of a house with no problem even while the cogeneration system is not supplying electric power. However, when the cogeneration system is independently operating to supply electric power as an emergency power supply during a power failure, the power supply to an electric power load of a house stops immediately after the cogeneration system stops power generation. Even when the cogeneration system is operating in conjunction with an independent operation support device including a secondary battery, supplying of electric power stops as a matter of course when the secondary battery is used up.

However, since a conventional cogeneration system displays information merely on the assumption of normal operation in which users are provided with information on a current electric power generated by the cogeneration system and purchased electric power, the conventional cogeneration system cannot provide users with helpful information when the cogeneration system independently operates as an emergency power supply, that is, information when the cogeneration system stops power generation due to limitation of heat which water in a water tank can absorb from the cogeneration system. The users cannot prepare for a failure of supply of electric power from the emergency power supply, which is a problem the Inventors have found.

In addition, since a cogeneration system independently operating as an emergency power supply is not supplied with electric power by a system power supply, deficiency in power supply to an electric power load of a house is not compensated for even when the electric power load exceeds a rated electric power (maximum electric power) of the cogeneration system. Thus, the cogeneration system stops power generation in response to overload when the electric power load exceeds the rated electric power of the cogeneration system.

To sum it up, since a conventional cogeneration system displays information merely on the assumption of normal operation in which users are provided with information on an electric power currently generated and purchased electric power, the conventional cogeneration system cannot provide users with helpful information when the cogeneration system independently operates as an emergency power supply, that is, information on a current reserved electric power in relation to its rated electric power. Thus, there is a problem with the conventional cogeneration system that when the cogeneration system is used as an emergency power supply, the user is required to increase power use while facing a risk of stop of power generation due to an electric power load exceeding a rated electric power.

Conceived to address the problem, the present invention has an object of providing a cogeneration system which allows users to prepare for stop of power generation when the cogeneration system is in independent operation.

Solution to Problem

In order to achieve the above-described abject, there is provided a cogeneration system according to an aspect of the present invention includes: a cogeneration apparatus which generates electric power using supplied fuel gas and supplies the electric power and heat; a heat accumulator which accumulates the heat supplied by the cogeneration apparatus; a controller which controls at least start and stop of the cogeneration apparatus; and a display unit configured to display a remaining power generation duration which is a length of time for which the cogeneration apparatus can continue power generation, wherein the controller further calculates the remaining power generation duration based on a remaining heat accumulation capacity which is a difference between a maximum accumulable heat amount and a current accumulated heat amount, and causes the display unit to display the calculated remaining power generation duration, the maximum accumulable heat amount being an amount of heat which the heat accumulator is capable of accumulating, and the current accumulated heat amount being an amount of heat currently accumulated in the heat accumulator.

Advantageous Effects of Invention

The cogeneration system according to the present invention displays remaining power generation duration, so that users can easily recognize the remaining power generation duration before a failure of the cogeneration system and prepare for stop of power generation.

BRIEF DESCRIPTION OF DRAWINGS

FIG. 10 shows an example of an equation for calculation of a remaining power generation duration.

DESCRIPTION OF EMBODIMENTS

Figure 1:
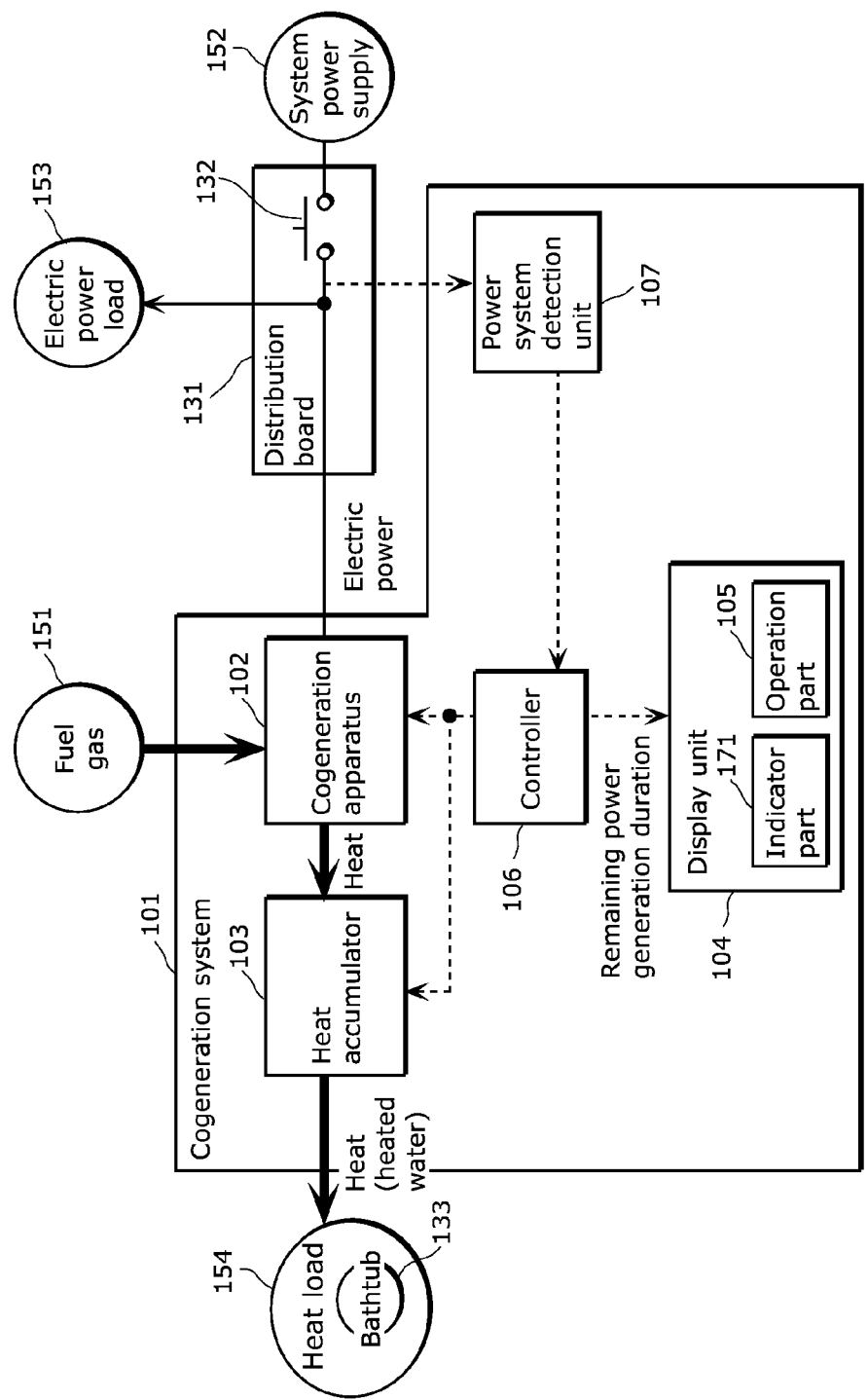
FIG. 1 is a block diagram schematically illustrating a configuration of a cogeneration system in Embodiment 1 of the present invention.

The following describes cogeneration systems according to the present invention.

A cogeneration system according to an aspect of the present invention a cogeneration apparatus which generates electric power using supplied fuel gas and supplies the electric power and heat; a heat accumulator which accumulates the heat supplied by the cogeneration apparatus; a controller which controls at least start and stop of the cogeneration apparatus; and a display unit configured to display a remaining power generation duration which is a length of time for which the cogeneration apparatus can continue power generation, wherein the controller further calculates the remaining power generation duration based on a remaining heat accumulation capacity which is a difference between a maximum accumulable heat amount and a current accumulated heat amount, and causes the display unit to display the calculated remaining power generation duration, the maximum accumulable heat amount being an amount of heat which the heat accumulator is capable of accumulating, and the current accumulated heat amount being an amount of heat currently accumulated in the heat accumulator.

With this, the display unit displays remaining power generation duration, so that users can easily recognize the remaining power generation duration and decide whether to prepare for a failure of supply of electric power. In particular, when the cogeneration system is independently operating as an emergency power supply in the event of a failure of a system power supply, no electric power is supplied to an in-home electric power load when the cogeneration system stops power generation. In such a case, users with the recognition of the remaining power generation duration may avoid the negative impact of a sudden failure of supply of electric power on electric appliances by turning off the electric appliances by themselves. For example, a user turns off information devices such as personal computers before power supply stops, so that the user can prevent loss of important working data in the information devices. Optionally, a user can decide whether to turn off a low-priority electric appliance to reduce power use or to bathe to consume heat accumulated in the heat accumulator to increase the remaining heat accumulation capacity, so that electric power can be generated for a longer time to supply the electric power to high-priority electric appliances over a longer time.

Furthermore, the indicator also shows users the proportion of a current electric power generated by the cogeneration system to its maximum electric power, so that the users can use electric power with an awareness of a current reserved power generation capacity of the cogeneration system when the cogeneration system is independently operating as an emergency power supply. It is thus possible to prevent a sudden failure of supply of electric power due to power use exceeding the power generation capacity.

The controller may calculate the remaining power generation duration by dividing the remaining heat accumulation capacity of the heat accumulator by a heat supply rate which is an amount of heat to be supplied to the heat accumulator per unit time by the cogeneration apparatus Thereby taking into consideration the rate of accumulation of heat into the heat accumulator, the remaining power generation duration thus calculated is more appropriate to be displayed to users.

Furthermore, the controller may store an estimated heat load which is an estimated value of an amount of heat to be supplied to a heat load by the cogeneration apparatus; and calculate the remaining power generation duration by dividing a sum of the remaining heat accumulation capacity and the estimated heat load by a heat supply rate which is an amount of heat to be supplied to the heat accumulator per unit time by the cogeneration apparatus.

Thereby taking an estimated heat load into consideration, the remaining power generation duration thus calculated is more appropriate to be displayed to users.

Furthermore, the controller may calculate the heat supply rate from a current electric power generated by the cogeneration apparatus.

With this, the remaining power generation duration to be displayed is calculated based on the assumption that a current electric power generated by the cogeneration apparatus remains at the same level.

Furthermore, the controller may store an estimated electric power load which is an estimated value of electric power to be supplied to an electric power load by the cogeneration apparatus, and calculate the heat supply rate based on the estimated electric power load.

Thereby taking an estimated electric power load into consideration to calculate a heat supply rate, the remaining power generation duration thus calculated using the heat supply rate with consideration of change in electric power load is more appropriate to be displayed to users.

Furthermore, the heat accumulator may be a water tank for storing heated water, the display unit may have an operation part which allows a user to set a bath-filling time which is a time to feed the heated water from the water tank to a bathtub, and when the bath-filling time is previously set, the controller may store, as the estimated heat load, an amount of heat to be supplied from the water tank to the bathtub from the bath-filling time.

Thereby taking into consideration the heat amount of bathwater, which accounts for the largest part of the amount of heat released from the heat accumulator in a house, the remaining power generation duration thus calculated is more appropriate to be displayed.

Furthermore, the controller may further calculate a minimum remaining power generation duration by dividing the remaining heat accumulation capacity by a maximum heat supply rate which is a maximum amount of heat to be supplied to the heat accumulator per unit time by the cogeneration apparatus, and causes the display unit to display the minimum remaining power generation duration.

With this, the user is provided with information on the minimum remaining power generation duration, so that the user can prepare for a failure of supply of electric power even when an electric power load in use may fluctuate.

Furthermore, the controller may further calculate a proportion of the current electric power generated by the cogeneration apparatus to a maximum electric power which the cogeneration apparatus is capable of generating, and causes the display unit to display the proportion.

This allows the user to use electric power with an awareness of the proportion of a current electric power generated by the cogeneration system to its maximum electric power, in other words, the reserve generation capacity of the cogeneration system, so that failures of supply of electric power due to power use exceeding the power generation capacity can be prevented.

Furthermore, when the remaining power generation duration reaches or falls below a predetermined threshold value, the controller may further issue a notification which prompts use of heat accumulated in the heat accumulator.

With this, a notification which prompts use of heat accumulated in the heat accumulator is issued when the remaining power generation duration has become short. This positively allows the user to recognize an action to take in order to continue power generation, so that heat accumulated in the heat accumulator is consumed for sure. As a result, the heat accumulator is prevented from becoming full, so that the cogeneration system can keep supplying electric power.

Furthermore, the cogeneration system may further include a power system detection unit configured to detect a state of supply of electric power from a system power supply connected to the cogeneration apparatus, wherein when the power system detection unit detects a failure of the supply of electric power from the system power supply, the controller may cause the display unit to display the remaining power generation duration.

With this, the remaining power generation duration is displayed while the cogeneration system is independently operating as an emergency power supply in the event of a failure of the system power supply. This allows the user to easily know that electric power is being supplied only by the cogeneration system, so that the user can use the electric power in an appropriate manner and prepare for a failure of power supply more securely.

Furthermore, the cogeneration system may further include a secondary battery which supplies electric power to an electric power load to which the cogeneration apparatus supplies electric power, wherein the controller may further calculate a remaining power supply duration which is a length of time for which the secondary battery can continue supplying electric power to the electric power load, and causes the display unit to display the remaining power supply duration.

With this, the remaining power supply duration of the secondary battery is also displayed. This allows the user to know the remaining power supply duration by the cogeneration system, taking into consideration not only electric power from the cogeneration apparatus but also electric power from the secondary battery.

Furthermore, when the secondary battery is being charged with electric power supplied by the cogeneration apparatus, the controller further may further display information that the electric power is being supplied to the secondary battery by the cogeneration apparatus.

With this, the controller also displays that the secondary battery is being recharged. This allows the user to easily know that the cogeneration system has a reserved power generation capacity and that the secondary battery is being recharged.

The above-described general and specific aspects of the present invention may be implemented using a system, a method, an integrated circuit, a computer program, or a computer-readable recording medium such as a CD-ROM, or any combination of a system, a method, an integrated circuit, a computer program, and a recording medium.

The following describes a fuel cell system in preferable embodiments of the present invention with reference to the drawings. In the following description, constituent elements that are the same or equivalent are denoted by the same reference signs, and thus description thereof is omitted.

The present invention is not limited to the embodiments. Thus, each of the embodiments described below shows a specific example of the present invention. The numerical values, shapes, materials, constituent elements, the arrangement and connection of the constituent elements, steps, the processing order of the steps etc. shown in the following embodiments are given not for limiting the present invention but merely for illustrative purposes only. Therefore, among the constituent elements in the following embodiments, constituent elements not recited in an independent claim defining the most generic part of the inventive concept are described as optional constituent elements.

Embodiment 1

FIG. 1 is a block diagram schematically illustrating a configuration of a cogeneration system 101 in Embodiment 1 of the present invention. FIG. 1 also shows surrounding facilities of the cogeneration system 101, such as a distribution board 131, fuel gas 151, a system power supply 152, an electric power load 153, and a heat load 154. In FIG. 1, the bold solid lines between the constituent elements indicate pipes, and the arrow heads on the bold solid lines indicate the directions of flows of water and reformed gas in the pipes. The thin solid lines indicate electric lines including a system power supply which deliver electric power to the electric power load 153, and the arrow heads on the thin solid lines indicate the directions of flows of electric power in the electric power lines. The dashed lines between the constituent elements indicate signal lines, and the arrow heads on the dashed lines indicate the directions of flows of signals delivered through the signal lines.

As shown in FIG. 1, the cogeneration system 101 according to Embodiment 1 of the present invention includes a cogeneration apparatus 102. The cogeneration apparatus 102 generates electric power using supplied fuel gas and supplies the electric power and heat. In Embodiment 1 of the present invention, the cogeneration apparatus 102 includes a fuel cell. Various types of fuel cells may be used as the fuel cell in the cogeneration apparatus 102, such as a polymer electrolyte fuel cell and a solid-oxide fuel cell. A gas engine may also be used as the cogeneration apparatus 102.

In Embodiment 1, the cogeneration apparatus 102 includes a hydrogen generation unit (not shown), a fuel cell (not shown), a pump, and a valve (not shown). The hydrogen generation unit generates hydrogen from supplied fuel gas 151. The fuel cell generates electric power at a predetermined level using a chemical reaction between the generated hydrogen and oxygen in the air. The pump and valve function to deliver the hydrogen and oxygen. The cogeneration apparatus 102 is not limited to the above-described configuration but may be any apparatus capable of generating and supplying electric power and heat concurrently, such as a gas engine. In Embodiment 1 of the present invention, the fuel gas 151 is a supply of natural gas from an infrastructure (not shown). The supply of fuel gas 151 is not limited to this, but may be a supply of any fuel gas that contains organic compounds of at least carbon and hydrogen and from which hydrogen can be generated. Examples of the organic compounds include hydrocarbons contained in liquefied petroleum gas (LPG), alcohol such as methanol, and naphtha.

The cogeneration system 101 further includes a heat accumulator 103 for accumulation of heat generated in power generation by the cogeneration apparatus 102. The heat accumulator 103 accumulates heat supplied by the cogeneration apparatus 102. In Embodiment 1 of the present invention, the heat accumulator 103 includes a water tank. The heat accumulator 3 converts heat generated in the cogeneration apparatus 102 into heated water using a heat exchanger (not shown) and accumulates heat by storing the heated water in the water tank. Such a configuration of the heat accumulator 103 is not limited to this but may be any configuration that enables accumulation of heat generated by the cogeneration apparatus. For example, a heat resistant brick having a large heat capacity is applicable to the heat accumulator.

The cogeneration system 101 further includes a display unit 104 which is an input-output unit to serve as an interface with users. The display unit 104 has an indicator part 171 and an operation part 105. The indicator part 171 displays various types of information including a remaining power generation duration which is the length of time for which the cogeneration apparatus can continue power generation. The operation part 105 allows users to configure settings including a setting of a bath-filling time which is a time to feed heated water from the water tank to a bathtub. In Embodiment of the present invention, the display unit 104 includes a liquid-crystal display, and the operation part 105 includes a tactile switch.

The cogeneration system 101 further includes a controller 106. The controller 106 is a processing unit which controls at least start and stop of the cogeneration apparatus 102. In Embodiment 1, the controller 106 controls the pump and valve provided in the cogeneration system 101a series of operations of the cogeneration apparatus 102, that is, start, electric generation, and stop, and supply (accumulation) of heat into the heat accumulator 103. Furthermore, the controller 106 receives a signal from the operation part 105 to reflect the signal on the control of the cogeneration system 101 and causes the display unit 104 to display information on the cogeneration system 101. More specifically, the controller 106 calculates the remaining power generation duration based on a remaining heat accumulation capacity and causes the display unit 104 to display the calculated remaining power generation duration. The remaining heat accumulation capacity is a difference between a maximum accumulable heat amount (the amount of heat which the heat accumulator 103 is capable of accumulating) and a current accumulated heat amount (the amount of heat currently accumulated in the heat accumulator 103) in the heat accumulator 103.

The controller 106 includes a central processing unit (CPU) and a memory, for example, which are not shown in FIG. 1. The memory of the controller 106 previously stores a program for operations of the constituent elements of the cogeneration system 101, and the controller 106 appropriately controls the operation of the cogeneration system 101 according to the program stored in the memory.

The cogeneration system 101 is connected to an electric line of the system power supply 152 of an electric company via the distribution board 131. With this, electric power generated by the cogeneration apparatus 102 is supplied to the electric power load 153 of the house.

The distribution board 131 includes a power system cutoff switch 132 therein. The power system cutoff switch 132 enables switching between open and close, that is, connection to and disconnection from the system power supply 152. The power system cutoff switch 132 can be switched by users as appropriate. The power system cutoff switch 132 is closed, that is, connected during normal operation in which the system power supply 152 supplies electric power to the electric power load 153 of the house.

The cogeneration apparatus 102 includes an interconnection relay (not shown) in its output stage so that the cogeneration apparatus 102 and the system power supply 152 are switchably interconnected and turned parallel-off. Generally, the electric lines of the system power supply 152 deliver alternating current using a single-phase three-wire system or a three-phase three-wire system. Alternatively, the electric lines may deliver electric power using a single-phase two-wire system as a matter of course.

The cogeneration system 101 further includes a power system detection unit 107. The power system detection unit 107 detects presence or absence of supply of electric power from the system power supply 152, and transmits information of the result of the detection to the controller 106. In Embodiment 1 of the present invention, the power system detection unit 107 includes a current transformer (CT) and a voltage detection circuit. The power system detection unit 107 also detects the open-close state of the power system cutoff switch 132, and transmits information of the result of the detection to the controller 106 as well.

Furthermore, the cogeneration system 101 is connected to the heat load 154 of the house so that heat can be supplied to the heat load 154. In Embodiment 1 of the present invention, the heat load 154 is a hot-water supply load. Heat accumulated in the heat accumulator 103 is supplied as heated water to the heat load 154. Uses of the heated water depend on a user. In Japan, generally the largest heat load is to fill a bathtub 133 with heated water.

The following describes operation of the cogeneration system 101 according to Embodiment 1 of the present invention in detail with reference to the drawings.

The following first describes a normal operation of the cogeneration system 101. Upon receiving a signal indicating an instruction to start power generation issued when conditions for starting automatic operation are satisfied or an instruction to start power generation given by a user operating the operation part 105, the controller 106 controls the pump and valve provided in the cogeneration apparatus 102 to heat the hydrogen generation unit 102 so that the cogeneration apparatus 102 becomes ready for power generation. Next, when the cogeneration apparatus 102 becomes ready for power generation, the controller 106 checks the state of the system power supply 152 using the power system detection unit 107. When the system power supply 152 is in normal state, the controller 106 causes the interconnection relay in the cogeneration apparatus 102 to interconnect with system power supply 152 so that generated electric power is supplied to the electric line of the system power supply 152. Thus, the electric power load 153 of the house is supplied with both electric power from the system power supply 152 and electric power generated by the cogeneration apparatus 102. More specifically, when power demand by the electric power load 153 is smaller than the maximum electric power of the cogeneration apparatus 102, all electric power to be consumed by the electric power load 153 is supplied by the cogeneration apparatus 102. When power demand by the electric power load 153 is larger than the maximum electric power of the cogeneration apparatus 102, the system power supply 152 covers the deficiency.

As soon as the cogeneration apparatus 102 starts power generation, heat is also generated. Then, the controller 106 controls the pump and valve provided in the cogeneration system 101 so that the heat of the cogeneration apparatus 102 is supplied to the heat accumulator 103. In Embodiment 1 of the present invention, water is used as a heat carrier. Heat generated by the cogeneration apparatus 102 is converted into heated water using the heat exchanger to raise the temperature of water to carry the heat, and the heated water is stored in the water tank which serves as the heat accumulator 103. When a user opens a hot water faucet in the house as necessary, the heated water stored in the water tank is supplied and comes out. When a user gives an instruction for feeding hot water to a bathtub using the operation part 105, the controller 106 controls the valve and pump provided in the cogeneration system 101 so that the bathtub 133 is supplied with heated water. Heat is supplied by the cogeneration system 101 to the heat load of a house through these operations.

The following describes operation which is performed when supply of electric power from the system power supply 152 stops due to abnormality in the system power supply 152, that is, in the event of a power failure. When the system power supply 152 stops, the power system detection unit 107 detects a power failure by detecting absence of supply of electric power from the system power supply 152 from at least one of voltage and current, and transmits a signal indicating the result of the detection to the controller 106. As soon as the controller 106 recognizes the abnormality in the system power supply 152, the controller 106 stops supply of electric power by turning the interconnection relay in the cogeneration apparatus 102 parallel-off. This makes the cogeneration apparatus 102 enter a standby state, in which the cogeneration apparatus 102 is ready to generate electric power but is generating no electric power. Then, both supply of electric power from the system power supply 152 and supply from the cogeneration system 101 to the electric power load 153 of the house stops, so that the house suffers from a power failure and the electric power load 153 stops. Realizing the power failure from the stop of the electric power load 153 such as lighting and a television set, the user first turns off the electric power load 153 such as a television set and an air conditioner, and then turns on the power system cutoff switch 132 included in the distribution board 131. The power system cutoff switch 132 may be configured to turn on automatically.

When the power system detection unit 107 detects that the power system cutoff switch 132 is on, the controller 106 causes the interconnection relay in the cogeneration apparatus 102 to interconnect with system power supply 152 so that supply of electric power to the electric line is restarted. Thus, the electric power load 153 of the house is supplied with electric power again, and then the user turns on the electric power load 153 such as the lighting and television set one by one to activate the electric appliances.

This is the operation by which the cogeneration system 101 functions as an emergency power supply to solely supply electric power to the electric power load 153 of the house when the system power supply 152 stops, so that the user can have a comfortable time even during a power failure.

However, when the cogeneration system 101 is functioning as an emergency power supply as described above, there are two major constraints. One of the constraints is stop of power generation because of the limited heat accumulation capacity of the heat accumulator 103. As described above, the cogeneration apparatus 102 generates heat while generating electric power. However, when the heat is disposed of (exhausted) inadequately, the temperature of the cogeneration apparatus 102 increases so high that the cogeneration apparatus 102 cannot continue power generation. When the cogeneration apparatus 102 includes fuel cells, the temperature of the stacks of the fuel cells increases so high that the cogeneration apparatus 102 cannot continue power generation. In Embodiment 1, generated heat is accumulated in the heat accumulator 103. When the amount of heat accumulated in the heat accumulator 103 reaches its limit, no more heat is disposed of, and therefore power generation of the cogeneration apparatus 102 needs to be stopped. In order to avoid such stop of power generation, it is necessary to consume the heat accumulated in the heat accumulator 103, that is, in Embodiment 1 of the present invention, heated water stored in the water tank needs to be discharged for use by a user.

The other of the constraints is stop of power generation because of power use exceeding a power generation capacity. When power demand of the electric power load 153 exceeds the power generation capacity of the cogeneration apparatus 102 while the cogeneration system 101 is functioning as an emergency power supply, power supply becomes insufficient and voltage decreases because the system power supply 152, which would cover the deficiency in electric power, does not work. Eventually, power generation needs to be stopped. In order to avoid such stop of power generation, it is necessary to reduce electric power that the electric power load 153 of the house uses to below the maximum electric power of the cogeneration apparatus 102. In Embodiment 1 of the present invention, for example, a user is required to activate electric appliances once turned off with recognition of electric power used by each of the electric appliances so that the total electric power used by the active electric appliances does not exceed the maximum electric power of the cogeneration apparatus 102. The following details a screen to provide users with information helpful to cope with the above-described two constraints, with reference to the drawings.

Figure 2:
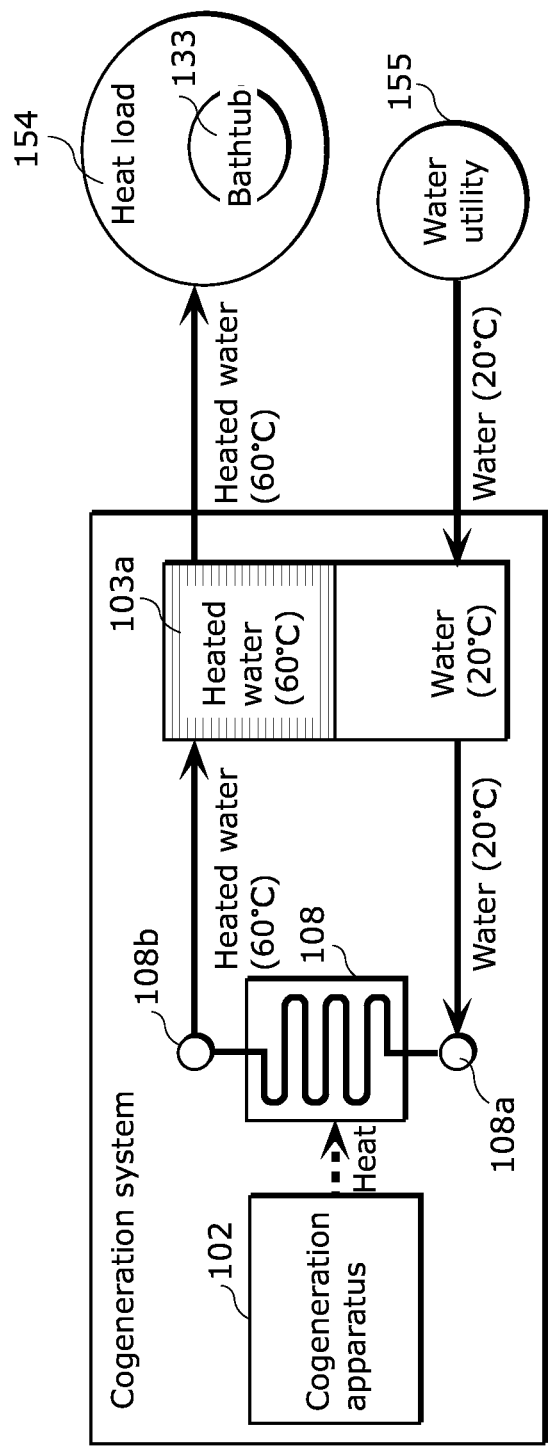
FIG. 2 is a block diagram schematically illustrating a configuration for heat supply of the cogeneration system in Embodiment 1 and Embodiment 2 of the present invention.

The following first describes a method of calculating values to be displayed. FIG. 2 is a block diagram schematically illustrating a configuration for heat supply of the cogeneration system 101 in Embodiment 1 of the present invention. FIG. 2 illustrates a heat exchanger 108 and a water tank 103a included in the cogeneration system 101 together with the cogeneration apparatus 102, and a water utility 155 peripheral to the cogeneration system 101 and the heat load 154. The heat exchanger 108 is a device which transfers heat generated by the cogeneration apparatus 102 to heated water, and includes a lower-temperature water port 108a and a higher-temperature side port 108b. The lower-temperature side port 108a is an intake for water having a lower temperature, and the higher-temperature water port 108b is an outlet for water having a higher temperature.

The water tank 103a is a component member of the heat accumulator 103 shown in FIG. 1 and has a capacity of 200 liters, for example. The lower-temperature water port 108a of the heat exchanger 108 is connected to a lower part of the water tank 103a by a pipe, and the higher-temperature water port 108b of the heat exchanger 108 is connected to an upper part of the water tank 103a by a pipe.

The utility water 155 is connected to a lower part of the water tank 103a by a pipe. The heat load 154 of the house is connected to an upper part of the water tank 103a by a pipe. The water tank 103a has temperature sensors (not shown) for measuring the amount of heat accumulated in the water tank 103a.

Figure 3:
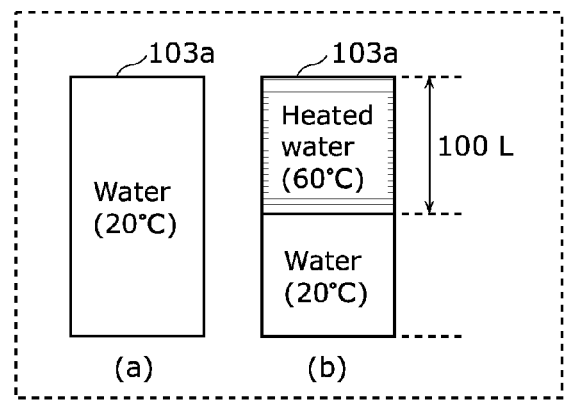
FIG. 3 illustrates heated water stored in a water tank in Embodiment 1 and Embodiment 2 of the present invention.

The following details simplified water-supply operation of the cogeneration system 101 according to Embodiment 1 of the present invention with reference to the drawings. The following description is based on an assumption that in Embodiment 1 of the present invention, water from the water utility 155 has a temperature of 20° C. and heated water output from the higher-temperature water port 108b of the heat exchanger 108 has a temperature of 60° C. FIG. 3 illustrates heated water stored in the water tank 103a in Embodiment 1 of the present invention.

The water tank 103a is filled with water supplied from the water utility 155 before the cogeneration apparatus 102 starts generating electric power ((a) in FIG. 3). After the cogeneration apparatus 102 starts generating electric power, the pump and valve (not shown) in the cogeneration apparatus 102 are activated in order to recover heat generated in the generating of electric power, and water is supplied from the lower part of the water tank 103a to the lower-temperature water port 108a of the heat exchanger 108. The water supplied receives heat to be heated to 60° C. in the heat exchanger 108, and then is returned to the upper part of the water tank 103a via the higher-temperature water port 108b. As a result, heated water stored in the water tank 103a forms a layer in the upper part of the water tank 103a ((b) in FIG. 3).

Assume that the water tank 103a stores 100 liters of heated water at 60° C. as shown in (b) in FIG. 3 at a certain time while the cogeneration apparatus 102 is generating electric power. In other words, one of the temperature sensors provided at a height between which and the water surface 100 liters of water is stored reads 60° C. The amount of heat accumulated in the water tank 103a at this time is now used as a current accumulated heat amount. The current accumulated heat amount may be considered as an integrated value of the amount of heat that the water in the water tank 103a has received while passing through the heat exchanger 108. Therefore, the current accumulated heat amount is calculated from increase in water temperature by the heat exchanger 108 and the amount of the heated water as shown by EQUATION 101 shown below.

$$\begin{aligned}(\text{Current accumulated heat amount}) =\\ ((\text{temperature of water output from the heat exchanger 108}) -\\ (\text{temperature of water input into}\\ \text{the heat exchanger 108)) [° C.]} \times\\ (\text{the amount of heated water) [L]} =\\ (60-20) \text{ [° C.]} \times 100 \text{ [L]} = 4{,}000 \text{ [kcal]}\end{aligned} \quad (101)$$

The maximum accumulable heat amount of the water tank 103a is calculated in a similar manner using the storage capacity of the water tank 103a, 200 liters, as shown by EQUATION 102 below.

$$\begin{aligned}(\text{Maximum accumulable heat amount}) =\\ (60-20) \text{ [° C.]} \times 200 \text{ [L]} = 8{,}000 \text{ [kcal]}\end{aligned} \quad (102)$$

Here, a remaining heat accumulation capacity which is the amount of heat additionally accumulable in the water tank 103a at the time shown in (b) in FIG. 3 is calculated by EQUATION 103 shown below.

$$\text{(Remaining heat accumulation capacity)} = \quad (103)$$
$$\text{(maximum accumulable heat amount) [kcal]} -$$
$$\text{(current accumulated heat amount) [kcal]} =$$
$$8{,}000 \text{ [kcal]} - 4000 \text{ [kcal]} =$$
$$4{,}000 \text{ [kcal]} = 16{,}727{,}600 \text{ [J]}(= 4{,}000 \times 4.1819) =$$
$$4.65 \text{ [kWh]} \ (= 16{,}727{,}600 \div 3{,}600{,}000)$$

The cogeneration apparatus 102 stops power generation when no more heat generated in power generation can be recovered. The remaining power generation duration is equivalent to time to be taken to fill up the remaining heat accumulation capacity (that is, to fill the water tank 103a with heated water at 60° C.). The cogeneration apparatus 102 in Embodiment 1 of the present invention includes fuel cells, and assumed to have a rated electric power of 1 kW, a generating efficiency of 30%, and a heat recovery efficiency of 40%. When the electric power load 153 uses electric power of 0.5 kW at the time when the water tank 103a is in the state shown in (b) in FIG. 3, the current electric power generated by the fuel cells of the cogeneration apparatus 102 is 0.5 kW. In this case, a heat supply rate which is the amount of heat to be supplied to the water tank 103a per unit time via the heat exchanger 108 is calculated by EQUATION 104 shown below.

$$\text{(Heat supply rate)} = \text{(Electric power currently generated) [kW]} \times \quad (104)$$
$$\text{((heat recovery effciency) [\%]/}$$
$$\text{(generating efficiency) [\%])} =$$
$$0.5 \text{ [kW]} \times (40 \text{ [\%]}/30 \text{ [\%]}) = 0.67 \text{ [kW]}$$

When the electric power remains at 0.5 kW at the time shown in (b) in FIG. 3, a remaining power generation duration is calculated from the remaining heat accumulation capacity (EQUATION 103) and the heat supply rate (EQUATION 104) by EQUATION 105 as shown below.

$$\text{(Remaining power generation duration)} = \quad (105)$$
$$\text{(remaining heat accumulation capacity) [kWh]} \div$$
$$\text{(heat supply rate) [kW]} = 4.65 \text{ [kWh]} \div 0.67 \text{ [kW]} = 7 \text{ hours}$$

Thus, the controller 106 calculates a remaining power generation duration by dividing a remaining heat accumulation capacity of the heat accumulator 103 by a heat supply rate which is the amount of heat to be supplied to the heat accumulator 103 per unit time by the cogeneration apparatus 102.

When there is a change in electric power generated by the cogeneration apparatus 102, the change causes a change in the supply (accumulation) of heat into the water tank 103a via the heat exchanger 108. When electric power generated by the cogeneration apparatus 102 increases, the heat supply rate also increases, and thus the remaining power generation duration shortens. When electric power generated by the cogeneration apparatus 102 decreases, the remaining power generation duration extends. In such a manner, the rate of heat supply to the water tank 103a (heat supply rate) is maximized when the cogeneration apparatus 102 generates at its maximum electric power, that is, a rated electric power of 1 kW. In this case, the remaining power generation duration is at a minimum. The heat supply rate and the remaining power generation duration in this case, that is, the maximum heat supply rate and the minimum remaining power generation duration are calculated by EQUATION 106 and EQUATION 107, respectively.

$$\text{(Maximum heat supply rate)} = \quad (106)$$
$$\text{(rated electric power) [kW]} \times \text{((heat recovery efficiency) [\%]/}$$
$$\text{(generating efficiency) [\%])} =$$
$$1 \text{ [kW]} \times (40 \text{ [\%]}/30 \text{ [\%]}) = 1.33 \text{ [kW]}$$

$$\text{(Minimum remaining power generation duration)} = \quad (107)$$
$$\text{(remaining heat accumulation capacity) [kWh]} \div$$
$$\text{(maximum heat supply rate) [kW]} =$$
$$4.65 \text{ [kWh]} \div 1.33 \text{ [kW]} = 3.5 \text{ hours}$$

Figure 4:
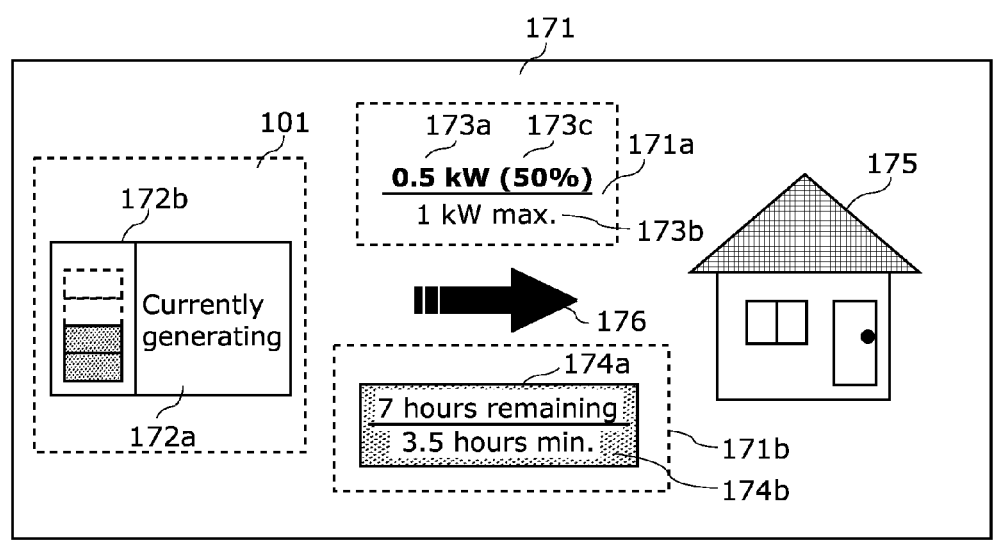
FIG. 4 illustrates information to be displayed on a display unit of the cogeneration system in Embodiment 1 of the present invention.

The following describes information to be displayed. FIG. 4 illustrates information to be displayed on the indicator part 171 of the display unit 104 of the cogeneration system in Embodiment 1 of the present invention. As in the above-described calculations, FIG. 4 shows the cogeneration system 101 in the state at the time shown in (b) in FIG. 3.

In FIG. 4, the indicator part 171 of the display unit 104 in Embodiment 1 of the present invention includes a dot-matrix liquid crystal display, and all information displayed on the indicator part 171 is handled by the controller 106.

An indication 172a displayed on the indicator part 171 indicates states of the cogeneration apparatus 102, such as "ON", "Currently generating", and "OFF". An indication 172b displayed on the indicator part 171 indicates four levels of the amount of heated water stored in the water tank 103a.

An indication 171a displayed on the indicator part 171 indicates information on electric power generated by the cogeneration apparatus 102. More specifically, the indication 171a includes an indication 173a indicating a current electric power generated by the cogeneration apparatus 102, an indication 173b indicating a rated electric power (that is, a maximum electric power) of the cogeneration apparatus 102, and an indication 173c indicating a proportion (percentage) of the current electric power (the value of the indication 173a) to the maximum electric power (the value of the indication 173b).

An indication 171b displayed on the indicator part 171 includes an indication 174a indicating a remaining power generation duration when the power generation remains at the current level (the value of the indication 173a) and an indication 174b indicating a remaining power generation duration when the power generation is continued at a maximum level (the value of the indication 173b), that is, the minimum power generation duration.

An indication 175 indicating a house of a user and an arrow 176 indicate that the electric power generated by the cogeneration apparatus 102 is being supplied to the house of a user.

The following details information intended to be delivered using the indications on the indicator part 171 with reference to the values included in the indications. The cogeneration system 101 at the time shown in (b) in FIG. 3 is generating electric power and supplying the electric power to the house of the user (indication 175) with the water tank 103a having a capacity of 200 liters half-filled with 100 liters of heated water. Thus, the indication 172a showing "Generating power", the indication 172b showing two bars, and the indication 176 pointing the indication 175 are displayed.

At this time, the current electric power generated by the cogeneration apparatus 102 is 0.5 kW. Thus, the indicator part 171 shows the user the indication 173a which reads "0.5 kW" indicating the current electric power, the indication 173b which reads 1.0 kW indicating a maximum electric power, and the indication 173c which reads 50% indicating a proportion of the current electric power to the maximum electric power. The indication 173c indicating a proportion shows the user is using electric power at half of the level of the maximum electric power of the cogeneration apparatus 102, so that the user can more appropriately decide whether or not to turn on another electrical appliance. Furthermore, the indication 173a indicating the current electric power and the indication 173b indicating the maximum electric power allow the user to easily recognize an absolute value of 0.5 kW (=1.0 kW−0.5 kW) of the amount of electric power additionally available, so that the user can more appropriately decide whether or not to turn on another electrical appliance.

Furthermore, the indicator part 171 shows the user the indication 174a which reads 7 hours indicating the remaining power generation duration calculated by EQUATION 105, and the indication 174b which reads 3.5 hours indicating the minimum power generation duration calculated by EQUATION 107. The indication 174a indicating the remaining power generation duration shows the user how long the user can continue using electric power at the current level, in other words, only the electric appliance(s) which the user is currently using. Thus, when the user wants to use electric power for a longer time, the user can decide whether to turn off a low-priority electric appliance or to bathe to consume heated water in the water tank 103a to increase the remaining heat accumulation capacity so that the remaining power generation duration can be extended. Optionally, the user can turn off electrical appliances before a failure of power supply due to stop of power generation so that the user can prevent negative impact of a sudden power failure on the electric appliances, such as loss of important data in a personal computer. Furthermore, the indication 174a indicating a minimum power generation duration shows the user the power generation duration for use of electric power at the highest level so that the user can take the above-described actions or turn off electrical appliances to use electric power for a longer time, taking into consideration future change in power consumption level caused by, for example, automatic operation of an electrical appliances.

As described above, the display unit 104 of the cogeneration system 101 includes the indications 173a to 173c on electric power generated by the cogeneration apparatus 102 and the indications 174a and 174b on remaining power generation duration so that a user can have not only information that the cogeneration system 101 is operating as an emergency power supply but also information on the remaining power generation duration and the electric power, which are information necessary to meet the above-described two constraints (stop of power generation because of a limited heat accumulation capacity and stop of power generation because of power use exceeding a power generation capacity) at the time. Thus, the user can decide to prepare for a failure of power supply and take an action with an awareness of the remaining amount of the power generation capacity.

Furthermore, in the cogeneration system 101, a remaining heat accumulation capacity is calculated as a difference between a maximum accumulable heat amount of the heat accumulator 103a and a current accumulated heat amount in the heat accumulator 103a, and the remaining power generation duration is calculated as a time to be taken to fill up the remaining heat accumulation capacity at the current rate of heat supply from the cogeneration apparatus 102 (heat supply rate). The remaining power generation duration thus calculated using the rate of heat accumulation into the water tank 103a is more appropriate.

Furthermore, in Embodiment 1 of the present invention when the remaining power generation duration reaches or falls below a predetermined threshold value, the controller 106 may display a message on the indicator part 171 to prompt use of heated water in the water tank 103a, such as a message that "Feed heated water in the bathtub" or that "To continue power generation, use of heated water is necessary." In other words, when the remaining power generation duration reaches or falls below a predetermined threshold value, the controller 106 may issue a notification which prompts use of heat accumulated in the heat accumulator 103. This positively allows users to recognize an action to take in order to continue power generation, so that stop of power generation due to the water tank 103a full of heated water can be certainly prevented. The threshold value needs to be set to secure sufficient time for users to take an action to use heated water, and thus the threshold value in Embodiment 1 of the present invention is set to 40 minutes, which is double a time to be taken to fill a general bathtub with heated water.

For the cogeneration system 101, which allows users to program heated-water feeding to the bathtub 133 using the operation part 105, it is preferable to calculate a remaining power generation duration with consideration of the heat amount of heated water to be fed to the bathtub 133 within a remaining power generation duration of seven hours ahead of now. For example, when water at 40° C. is to be fed into the bathtub 133 having a capacity of 200 liters, the water is prepared from 100 liters of water at 60° C. and 100 liters of water at 20° C. This means that 100 liters of heated water in the water tank 103a is to be fed into the bathtub 133. The 100 liters of water at 60° C. has the amount of heat as much as the current accumulated heat amount calculated by EQUATION 101, that is, 4,000 kcal. When the 100 liters of heated water is fed from the water tank 103a into the bathtub, the remaining heat accumulation capacity of the water tank 103a increases accordingly. The remaining power generation duration is therefore calculated using EQUATION 108 shown below instead of EQUATION 105.

$$\begin{aligned}\text{(Remaining power generation duration)} =& \\ \text{(remaining heat accumulation capacity) [kWh]} +& \\ \text{(heat amount of water to be fed into bathtub)}& \\ \text{([kWh])} \div \text{(heat supply rate) [kW]} =& \\ (4.65 \text{ [kWh]} + 4.65 \text{ [kWh]}) \div 0.67 \text{ [kW]} = 14 \text{ hours}& \\ \text{Here, 4,000 kcal} = 4.65 \text{ kWh.}&\end{aligned}$$ (108)

To put it another way, when a bath-filling time has already been set using the operation part 105, the controller 106 may store, as an estimated heat load, the amount of heat to be supplied from the water tank to the bathtub 133 from the bath-filling time, and calculate a remaining power generation duration by dividing the sum of the remaining heat accumulation capacity and the estimated heat load by a heat supply rate which is the amount of heat to be supplied to the heat accumulator 103 per unit time by the cogeneration apparatus 102.

Then, the remaining power generation duration calculated by EQUATION 108 is displayed so that a user can recognize the remaining duration on which the change in the amount of accumulated heat caused by supply of bathwater having the largest heat amount of all types of heat loads in a house is reflected, and which is therefore more accurate.

When a screen having contents other than the above-described information, such as settings of the cogeneration system or a state history of the cogeneration system, is displayed on the indicator part 171 according to an operation by a user, the content described in Embodiment 1 is preferably displayed in a normal view so that the user can easily see the remaining power generation duration and the amount of electric power the user has already used.

The present invention may be implemented also as a controlling method for a cogeneration system. The cogeneration system includes the following steps.

Figure 5:
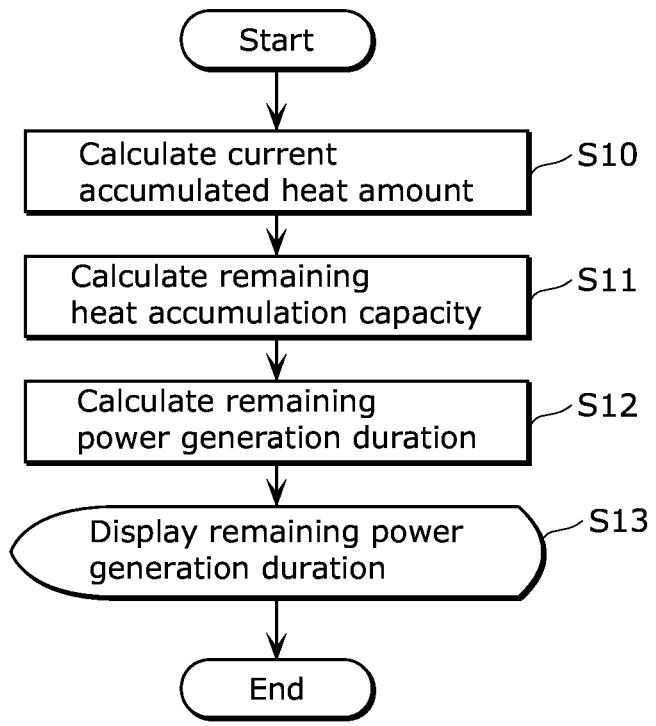
FIG. 5 is a flowchart illustrating main steps of a controlling method for the cogeneration system in the present invention.

FIG. 5 is a flowchart illustrating main steps of the controlling method for the cogeneration system 101 in the present invention. This is a method of controlling the cogeneration system 101 including the cogeneration apparatus 102 which supplies electric power and heat and the heat accumulator 103 which accumulates the heat supplied by the cogeneration apparatus 102. First, by using EQUATION 101, the controller 106 calculates a current accumulated heat amount which is the amount of heat currently accumulated in the heat accumulator 103 (S10). Next, the controller 106 calculates a remaining heat accumulation capacity of the heat accumulator 103 by calculating, using EQUATION 103, a difference between a maximum accumulable heat amount and the calculated current accumulated heat amount (S11). The maximum accumulable heat amount is the heat accumulation capacity of the heat accumulator 103. Next, the controller 106 calculates a remaining power generation duration which is the length of time for which the cogeneration apparatus 102 can continue power generation based on the calculated remaining heat accumulation capacity, by EQUATION 105 (S12). Finally, the controller 106 causes the display unit 104 to display the calculated remaining power generation duration (S13).

The controlling method for the cogeneration system 101 is not limited to the above-described main steps but may also include a step such as calculating a maximum accumulable heat amount by EQUATION 102 or calculating a heat supply rate by EQUATION 104.

Figure 6:
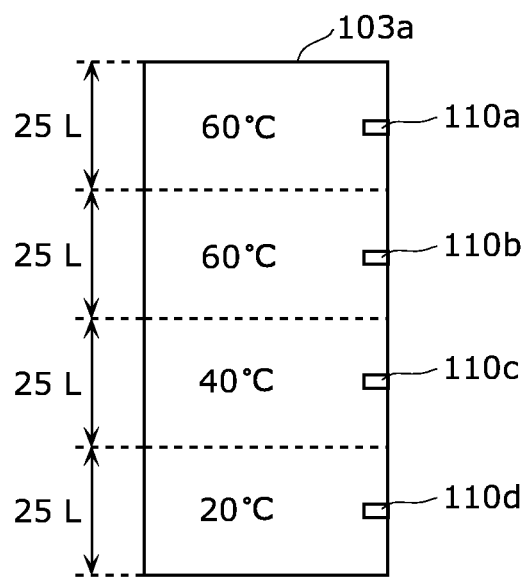
FIG. 6 shows an example of calculation of a current accumulated heat amount in a heat accumulator.

The method is not limited to the above-described method in which the current accumulated heat amount is calculated by the accumulator 103 using the temperature of the water outgoing from the heat exchanger 108, the temperature of the water entering the heat exchanger 108, and the amount of heated water. For example, the water tank 103a may be provided with temperature sensors 110a to 110d in each quarter sections of the water tank 103a as shown in FIG. 6 so that a current accumulated heat amount may be calculated using temperatures measured by the temperature sensors 110a to 110d. At this time, the temperatures measured by the temperature sensors 110a to 110d are used as representative temperatures of water in the respective quarter sections including the temperature sensors 110a to 110d for the calculation of a current accumulated heat amount. For example, for the temperatures shown in FIG. 6, the current accumulated heat amount is calculated to be 4,500 [kcal] (=60 [° C.]×25 [L]+60 [° C.]×25 [L]+40 [° C.]×25 [L]+20 [° C.]×25 [L]).

Embodiment 2

Figure 7:
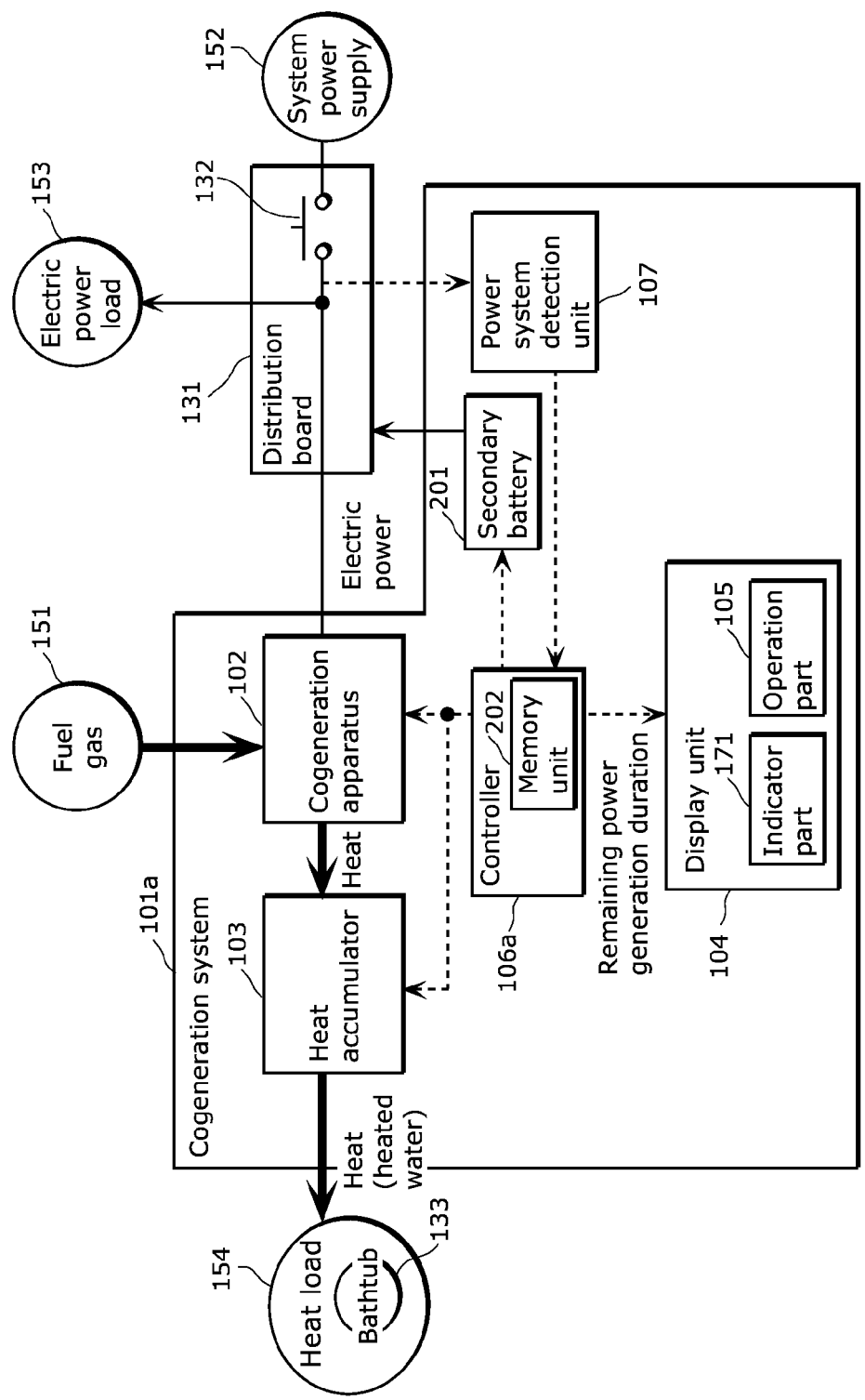
FIG. 7 is a block diagram schematically illustrating a configuration of a cogeneration system in Embodiment 2 of the present invention.

The following describes a cogeneration system 101a according to Embodiment 2 of the present invention. FIG. 7 shows a block diagram schematically illustrating a configuration of the cogeneration system 101a in Embodiment 2 of the present invention. Constituent elements in common with Embodiment 1 are denoted with the same reference signs, and description thereof is omitted. Embodiment 2 is different from Embodiment 1 in that the cogeneration system 101a includes a secondary battery 201 and a memory unit 202 in a controller 106a. The secondary battery 201 and a cogeneration system 101a are connected to an electric line of the system power supply 152 of an electric company at the same connection point via a distribution board 131.

The secondary battery 201 has a charging capacity of 10 kWh, for example, and includes a bidirectional inverter (not shown) so that the secondary battery 201 is capable of charging and discharging. For the rated electric power of the secondary battery 201, both charging and discharging are performed at 2 kW, for example.

The memory unit 202 records data on power demand of an electric power load 153 and data on heat demand of the heat load 154 as they occur. A controller 106a estimates power demand and heat demand of a house of a user from the data on power demand and the data on heat demand, and the result of the estimation is stored as estimated electric power load and estimated heat load in the memory unit 202. In Embodiment 2 of the present invention, the recording of data on power demand and data on heat demand and the estimating of future electric power load and heat load are performed every hour. More specifically, the controller 106a stores and averages data on power demand and data on heat demand each on a daily, weekly, monthly, and yearly bases. For example, the averaging is performed using weighting factors greater for newer data. Then, the controller 106a calculates an estimated electric power load and an estimated heat load for each hour in a day, each day in a week, each day in a month, and each month in a year.

The following describes an operation of the cogeneration system 101a. The cogeneration system 101a operates basically in the same manner as in Embodiment 1, but Embodiment 2 is different from Embodiment 1 in that the controller 106a controls the secondary battery 201 as well. The following description focuses on the difference.

In normal operation, the secondary battery 201 is charged with electric power from the system power supply 152 and the cogeneration apparatus 102. When the system power supply 152 stops, the cogeneration apparatus 102 also stops supply of electric power as in Embodiment 1. Thus, the charging of the secondary battery 201 stops because of the stop of the supply of electric power from the system power supply 152. Subsequently, when the power system detection unit 107 detects that the power system cutoff switch 132 is turned on by a user, the controller 106a instructs the cogeneration apparatus 102 to start supply of electric power and, at the same time, the secondary battery 201 to shift from charging mode to discharging mode to start supply of electric power. In Embodiment 2, the controller 106a gives the instruction for the power generation so that the cogeneration apparatus 102 and the secondary battery 201 evenly supplies electric power, that is, each of the cogeneration apparatus 102 and the secondary battery 201 covers half the power demand of the electric power load 153.

The cogeneration system 101a operates in this manner to function as an emergency power supply when the system power supply 152 stops. Moreover, due to the secondary battery 201, Embodiment 2 surpasses Embodiment 1 in the following two points. Firstly, supply of electric power to the electric power load is continued by the secondary battery 201 even after the cogeneration apparatus 102 reaches the limit of heat accumulation and stops power generation. Secondly, the secondary battery 201 covers excess of power use above the power generation capacity of the cogeneration apparatus 102.

However, the secondary battery 201 is limited in charging capacity and power supply capacity, there are two constraints. One is stop of power supply because of exhaustion of the secondary battery 201, and the other is stop of power supply because of power use exceeding the rated electric power.

The following details a screen to provide users with information helpful to cope with the above-described two constraints, with reference to the drawings.

The following first describes a method of calculating values to be displayed. The construction related to heat supply and the state of heated water in the water tank 103a in Embodiment 2 in the present invention are basically the same as those in Embodiment 1. Thus, FIG. 2 and FIG. 3 are referred to for them and description thereof is omitted for Embodiment 2. The operation for the heat supply and water storage in Embodiment 2 are also basically the same as those in Embodiment 1, and description thereof is omitted. Embodiment 2 is different from Embodiment 1 in a method of calculating a remaining power generation duration and a method of calculating values for a power supply and a remaining power supply duration of the secondary battery 201. The following description focuses on the differences.

As described in Embodiment 1, the remaining power generation duration is a period of time to be taken to fill up a remaining heat accumulation capacity calculated by EQUATION 103 in Embodiment. The remaining heat accumulation capacity is increased by using heated water in the water tank 103a. Thus, accuracy of the calculated remaining power generation duration can be increased by taking into consideration estimated use of heated water in the house of a user along with a current remaining heat accumulation capacity.

In Embodiment 2 of the present invention, when the electric power load 153 uses electric power of 0.5 kW as in Embodiment 1, the power supply of the cogeneration apparatus 102 and the power supply of the secondary battery 201 are 0.25 kW each. In other words, the current electric power generated by the cogeneration apparatus 102 is 0.25 kW, and thus the controller 106a calculates a heat supply rate using EQUATION 204 shown below instead of EQUATION 104.

$$\text{(Heat supply rate)} = \text{(electric power currently generated) [kW]} \times \quad (204)$$
$$\text{((heat recovery effciency) [\%]} /$$
$$\text{(generating efficiency) [\%])} =$$
$$0.25 \text{ [kW]} \times (40 \text{ [\%]}/30 \text{ [\%]}) = 0.33 \text{ [kW]}$$

When the power generation remains at the level of 0.25 kW as in the state shown in (b) in FIG. 3, and an estimated heat load in 14 hours from now is 2 kWh, a remaining power generation duration is calculated from the remaining heat accumulation capacity (EQUATION 103), the heat supply rate (EQUATION 204), and the estimated heat load by EQUATION 205 below.

$$\text{(Remaining power generation duration)} = \quad (205)$$
$$\text{((remaining heat accumulation capacity) [kWh]} +$$
$$\text{(estimated heat load) [kWh])} \div \text{(heat supply rate) [kW]} =$$
$$(4.65 \text{ [kWh]} + 2 \text{ [kWh]}) \div 0.33 \text{ [kW]} = 20 \text{ hours}$$

Thus, the controller 106a calculates a remaining power generation duration by dividing the sum of a remaining heat accumulation capacity and an estimated heat load by a heat supply rate.

Note that EQUATION 107 for calculation of a minimum remaining power generation duration is still appropriate because the remaining power generation duration is shortest when the estimated heat load is not used.

The following describes a method of calculating values for a power supply and a remaining power supply duration of the secondary battery 201. When the secondary battery 201 having a charging capacity of 10 kWh is fully charged, and the power supply of the secondary battery 201 is 0.25 kW, the controller 106a calculates a remaining power supply duration of the secondary battery 201 by EQUATION 251 below.

$$\text{(Remaining power supply duration)} = \quad (251)$$
$$\text{(amount of charge) [kWh]} \div \text{(power supply) [kW]} =$$
$$10 \text{ [kWh]} \div 0.25 \text{ [kW]} = 40 \text{ hours}$$

The controller 106a also calculates a minimum remaining power supply duration using a rated electric power of the secondary battery (for example, 2 kW) by EQUATION 252 below.

$$\text{(Minimum remaining power supply duration)} = \quad (252)$$
$$\text{(amount of charge) [kWh]} \div \text{(rated power supply) [kW]} =$$
$$10 \text{ [kWh]} \div 2 \text{ [kW]} = 5 \text{ hours}$$

Figure 8:
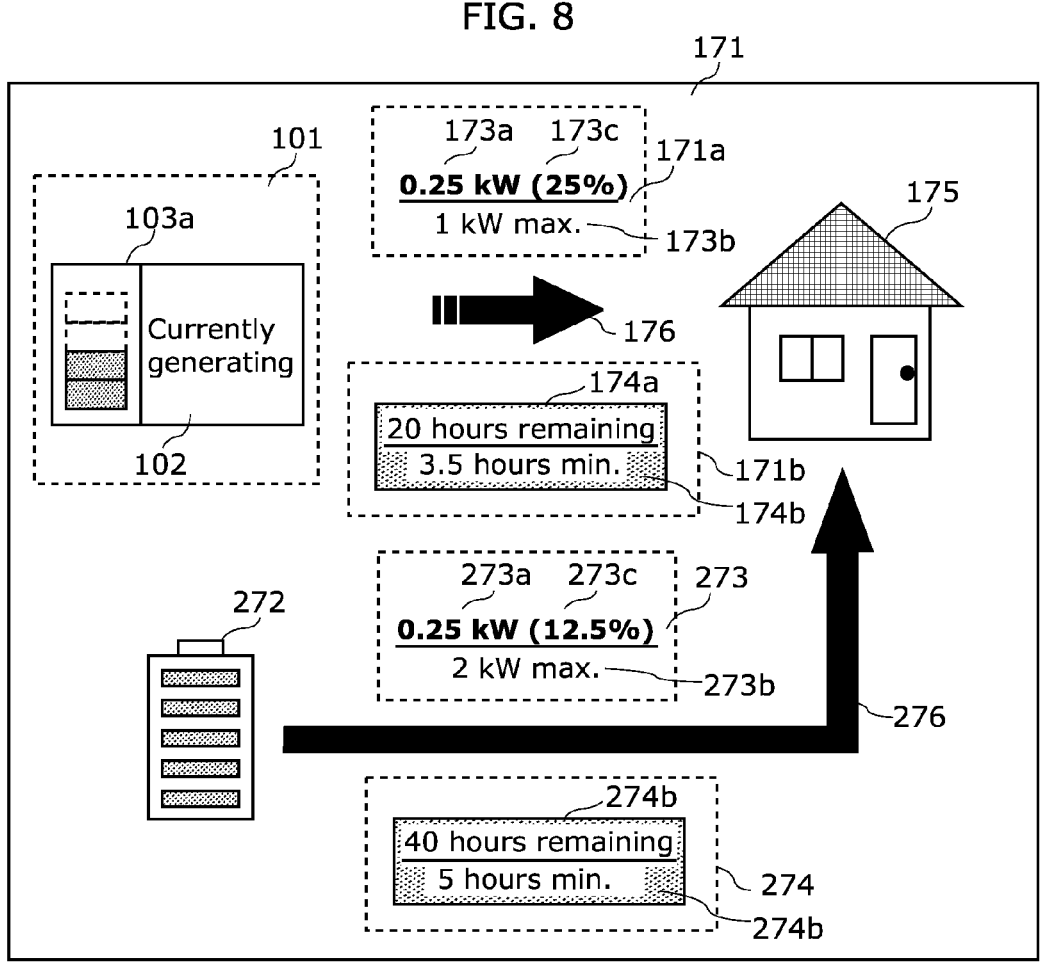
FIG. 8 illustrates information to be displayed on a display unit of the cogeneration system in Embodiment 2 of the present invention.

The following describes information to be displayed. FIG. 8 illustrates information to be displayed on the indicator part 171 of the display unit 104 of the cogeneration system 101a in Embodiment 2 of the present invention. Constituent elements in common with Embodiment 1 are denoted with the same reference signs, and description thereof is omitted.

In FIG. 8, the indicator part 171 includes an indication 272 for the secondary battery 201. The indication 272 indicates five levels of the charging state of the secondary battery 201.

An indication 273 displayed on the indicator part 171 indicates information on power supply by the secondary battery 201. More specifically, the indication 273 includes an indication 273a indicating a current power supply by the secondary battery 201, an indication 273b indicating a rated power supply (that is, a maximum power supply) of the secondary battery 201, and an indication 273c indicating a proportion (percentage) of the current power supply (the value of the indication 273a) to the maximum power supply (the value of the indication 173b).

The indicator part 171 also displays an indication 274 indicating a remaining power supply duration. More specifically, the indication 274 includes an indication 274a indicating a remaining power supply duration when power generation is continued while power supply remains at the current level (the value of the indication 273a) and an indication 274b indicating remaining power supply duration 274b when power generation is continued while the power supply is continued at a maximum level (the value of the indication 273b), that is, the minimum power supply duration.

An arrow 276 indicates that electric power is being supplied to the house of a user by the secondary battery 201.

The following details information intended to be delivered using the indications on the indicator part 171 with reference to the values included in the indications.

The current electric power generated by the cogeneration apparatus 102 is 0.25 kW. Thus, the indicator part 171 shows the user the indication 173a which reads "0.25 kW" indicating the current electric power, the indication 173b which reads 1.0 kW indicating a maximum electric power of the cogeneration apparatus 102, and the indication 173c which reads 25% indicating a proportion of the current electric power to the maximum electric power of the cogeneration apparatus 102.

Furthermore, the indicator part 171 shows the user the indication 174a which reads 20 hours indicating the remaining power generation duration calculated by EQUATION 205, and the indication 174b which reads 3.5 hours indicating the minimum power generation calculated by EQUATION 107. As described above, the remaining power generation duration indicated by the indication 174a takes an estimated electric power load into consideration, so that a user is provided with the remaining power generation duration as all the more accurate information on a period of time during which the user can continue using all electrical appliances currently the user is using because the information has taken future use of heated water into consideration. This allows the user to prepare for stop of power generation.

The secondary battery 201 is fully charged and the current power supply by the secondary battery 201 to the house of the user is 0.25 kW. Thus, the indicator part 171 is showing the indication 272 with all of the five bars, the indication 275 pointing the indication 175, the indication 273a indicating 0.25 kW as the current power supply, the indication 273b indicating 2.0 kW as a maximum power supply of the secondary battery 201, and the 273c indicating 12.5% as the proportion of the current power supply to the maximum power supply. The indication 273c and 173c shows the user the proportion of electric power currently the user is using to the total supplying capacity of the cogeneration apparatus 102 and the secondary battery 201, so that the user can more appropriately decide whether or not to turn on another electrical appliance. Furthermore, the indication 273a indicating a current power supply and the indication 273b indicating a maximum power supply allow the user to easily recognize an absolute value 1.75 kW (=2.0 kW−0.2 kW) of the amount of electric power additionally available from the secondary battery 201, so that the user can more appropriately decide whether or not to turn on another electrical appliance.

Furthermore, the indicator part 171 shows the user the indication 274a which reads 40 hours indicating the remaining power supply duration calculated by EQUATION 251, and the indication 274b which reads 5 hours indicating the minimum power supply duration calculated by EQUATION 252. The indication 274a indicating the remaining power supply duration shows the user how long the user can continue using electric power at the current level from now, in other words, use of only the electric appliances which the user is currently using, with consideration of the secondary battery 201. This allows the user to prepare for stop of power generation.

As described above, the cogeneration system 101a includes the display unit 104 on which the indications 173a to 173c showing information on electric power generated by the cogeneration apparatus 102, the indications 174a and 174b showing information on a remaining power generation duration, indications 273a and 273b showing information on power supplies by the secondary battery 201, and indications 274a and 274b showing information on a remaining power supply duration. These indications allow a user to easily know that the cogeneration system 101a is functioning as an emergency power supply and information necessary to meet the two major constraints (stop of power supply because of exhaustion of the secondary battery and stop of power supply because of power use exceeding the rated electric power). Thus, the user can decide to prepare for a failure of power supply and take an action with an awareness of the remaining capacity of the cogeneration system 101a.

The indications showing information on the cogeneration apparatus 102 and the secondary battery 201 are not limited to the examples shown in FIG. 8. For example, the indication may show such information using not only figures but also graphics such as bar graphs shown in the indicator part 171 in FIG. 9 as a display example.

Figure 9:
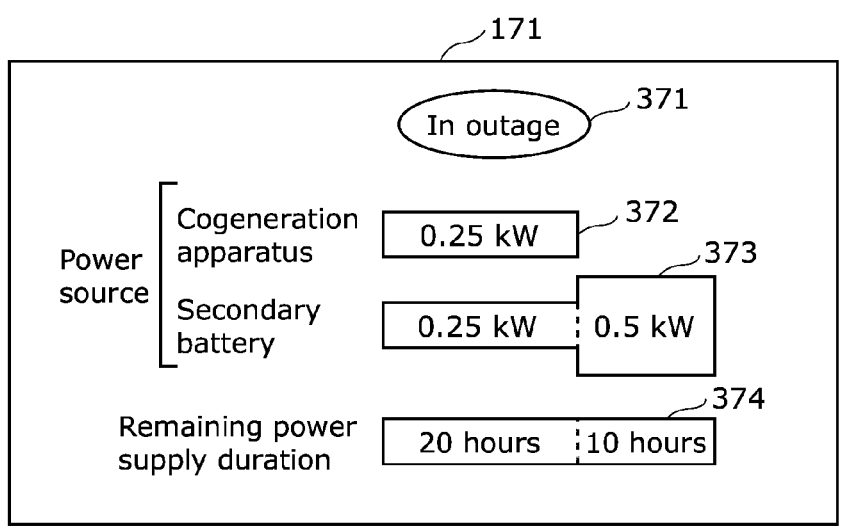
FIG. 9 illustrates another example of information to be displayed on the display unit of the cogeneration system in Embodiment 2 of the present invention.

FIG. 9 illustrates an indication 371 indicating an occurrence of power failure, an indication 372 indicating a power supply (for 20 hours) by the cogeneration apparatus 102, an indication 373 indicating a power supply by the secondary battery 201 (for 20 hours and subsequent 10 hours), and an indication 374 indicating a total remaining power supply duration from the cogeneration apparatus 102 and the secondary battery 201 (for 20 hours and subsequent 10 hours). Referring to FIG. 9, the width (dimension in the vertical direction in the drawing) of the bars indicating power supply is larger for a larger power supply. The length (dimension in the lateral direction in the drawing) of the bar indicating the remaining power supply duration is larger for a longer duration. Furthermore, the bars indicating the power supply and the bar indicating the remaining power supply duration share a temporal axis. More specifically, FIG. 9 illustrates that, on the assumption that the electric power load remains at 0.5 kW, the power supply by the cogeneration apparatus 102 and the power supply by the secondary battery 201 are 0.25 kW each during the first 20 hours, and the power supply by the secondary battery 201 during the subsequent 10 hours is 0.5 kW.

The estimated electric power load calculated by the controller 106a may be used for calculation of a heat supply rate, for example. For example, the heat supply rate calculated by EQUATION 104 using a current electric power generated by the cogeneration apparatus 102 in Embodiment 1 may be calculated by EQUATION 104 using an estimated electric power load instead of the current electric power. More specifically, a remaining power generation duration may be accurately calculated by using an estimated heat supply rate calculated using an estimated electric power load, so that the remaining power generation duration takes change in electric power load into consideration.

FIG. 10 shows an equation for the above-described calculation of a remaining power generation duration which is useful information for users. Basically, a remaining power generation duration is calculated by dividing a remaining heat accumulation capacity which is a difference between a maximum accumulable heat amount and a current accumulated heat amount, by a heat supply rate. When an estimated heat load is available, it is preferable here to divide, by a heat supply rate, the sum of the remaining heat accumulation capacity and the estimated heat load. A heat supply rate may be calculated using a current electric power generated by the cogeneration apparatus on the assumption that the power generation remains at the current level, and, when there is an available estimated electric power load, optionally the heat supply rate may be calculated using the estimated electric power load.

The present invention is not limited to the cogeneration system and the method of controlling the same according to one of more aspects of the present invention as described above based on the embodiments. Various modifications of the embodiments as well as embodiments resulting from arbitrary combinations of constituent elements of the different embodiments that may be conceived by those skilled in the art are intended to be included within the scope of the present invention as long as these do not depart from the essence of the present invention.

INDUSTRIAL APPLICABILITY

As described above, the cogeneration system according to the present invention calculates a remaining power generation duration by the cogeneration system from parameters such as the amount of heat accumulable in a heat accumulator and a power supply and shows the remaining duration to users, so that the users, easily knowing the remaining power generation duration, can prepare for a failure of supply of electric power when the cogeneration system is independently operating as an emergency power supply. Thus, the cogeneration system in the present invention is preferably applicable to the field of an independent operation including a cogeneration system.

REFERENCE SIGNS LIST 101, 101a Cogeneration system
102 Cogeneration apparatus
103 Heat accumulator
103a Water tank
104 Display unit
105 Operation part
106, 106a Controller
107 Power system detection unit
108 Heat exchanger
108a Lower-temperature water port
108b Higher-temperature water port
110a to 110d Temperature sensor
131 Distribution board
132 Power system cutoff switch
133 Bathtub
151 Fuel gas
152 System power supply
153 Electric power load
154 Heat load
155 Water utility
171 Indicator part
201 Secondary battery
202 Memory unit

The invention claimed is:

1. A cogeneration system comprising:
a cogeneration apparatus which generates electric power using supplied fuel gas and supplies the electric power and heat;
a heat accumulator which accumulates the heat supplied by the cogeneration apparatus;
a controller which controls at least start and stop of the cogeneration apparatus;
a display unit configured to display a remaining power generation duration which is a length of time for which the cogeneration apparatus can continue power generation;
a power system detection unit configured to detect a state of supply of electric power from a system power supply connected to the cogeneration apparatus; and
a power system cutoff switch which switches between an open state for disconnecting from the system power supply and a closed state for connecting to the system power supply,
wherein the controller further:
calculates the remaining power generation duration based on a remaining heat accumulation capacity which is a difference between a maximum accumulable heat amount and a current accumulated heat amount, the maximum accumulable heat amount being an amount of heat which the heat accumulator is capable of accumulating, and the current accumulated heat amount being an amount of heat currently accumulated in the heat accumulator;
when the power system detection unit detects a failure of the supply of electric power from the system power supply, causes switching of the power cutoff to the open state, and causes the display unit to display the calculated remaining power generation duration; and
calculates a minimum remaining power generation duration by dividing the remaining heat accumulation capacity by a maximum heat supply rate which is a maximum amount of heat to be supplied to the heat accumulator per unit time by the cogeneration apparatus, and causes the display unit to display the calculated minimum remaining power generation duration simultaneously with the displaying of the calculated remaining power generation duration.

2. The cogeneration system according to claim 1, wherein the controller calculates the remaining power generation duration by dividing the remaining heat accumulation capacity of the heat accumulator by a heat supply rate which is an amount of heat to be supplied to the heat accumulator per unit time by the cogeneration apparatus.

3. The cogeneration system according to claim 1, wherein the controller:
stores an estimated heat load which is an estimated value of an amount of heat to be supplied to a heat load by the cogeneration apparatus; and
calculates the remaining power generation duration by dividing a sum of the remaining heat accumulation capacity and the estimated heat load by a heat supply rate which is an amount of heat to be supplied to the heat accumulator per unit time by the cogeneration apparatus.

4. The cogeneration system according to claim 2, wherein the controller calculates the heat supply rate from a current electric power generated by the cogeneration apparatus.

5. The cogeneration system according to claim 2,
wherein the controller stores an estimated electric power load which is an estimated value of electric power to be supplied to an electric power load by the cogeneration apparatus, and
calculates the heat supply rate based on the estimated electric power load.

6. The cogeneration system according to claim 3,
wherein the heat accumulator is a water tank for storing heated water,
the display unit has an operation part which allows a user to set a bath-filling time which is a time to feed the heated water from the water tank into a bathtub, and
when the bath-filling time is previously set, the controller stores, as the estimated heat load, an amount of heat to be supplied from the water tank to the bathtub from the bath-filling time.

7. The cogeneration system according claim 1, wherein the controller further calculates a proportion of the current electric power generated by the cogeneration apparatus to a maximum electric power which the cogeneration apparatus is capable of generating, and causes the display unit to display the proportion.

8. The cogeneration system according to claim 1, wherein when the remaining power generation duration reaches or falls below a predetermined threshold value, the controller further issues a notification which prompts use of heat accumulated in the heat accumulator.

9. The cogeneration system according to claim 1, further comprising:
a secondary battery which supplies electric power to an electric power load to which the cogeneration apparatus supplies electric power,
wherein the controller further calculates a remaining power supply duration which is a length of time for which the secondary battery can continue supplying electric power to the electric power load, and causes the display unit to display the remaining power supply duration simultaneously with the displaying of the calculated remaining power generation duration and the calculated minimum remaining power generation duration.

10. The cogeneration system according to claim 9, wherein when the secondary battery is being charged with electric power supplied by the cogeneration apparatus, the controller further displays information that the electric power is being supplied to the secondary battery by the cogeneration apparatus.

11. A control method for a cogeneration system including:
a cogeneration apparatus which supplies electric power and heat;
a heat accumulator which accumulates the heat supplied by the cogeneration apparatus;
a power system detection unit which detects a state of supply of electric power from a system power supply connected to the cogeneration apparatus; and
a power system cutoff switch which switches between an open state for disconnecting from the system power supply and a closed state for connecting to the system power supply,
the method comprising:
calculating a remaining heat accumulation capacity of the heat accumulator by calculating a difference between a maximum accumulable heat amount and a current accumulated heat amount, the maximum accumulable heat amount being an amount of heat which the heat accumulator is capable of accumulating, and the current accumulated heat amount being an amount of heat currently accumulated in the heat accumulator;
calculating a remaining power generation duration which is a length of time for which the cogeneration apparatus can continue power generation, based on the calculated remaining heat accumulation capacity; and
when the power system detection unit detects a failure of the supply of electric power from the system power supply, causing switching of the power system cutoff switch to the open state, and causing a display unit to display the calculated remaining power generation duration; and
calculating a minimum remaining power generation duration by dividing the remaining heat accumulation capacity by a maximum heat supply rate which is a maximum amount of heat to be supplied to the heat accumulator per unit time by the cogeneration apparatus, and causing the display unit to display the calculated minimum remaining power generation duration simultaneously with the displaying of the calculated remaining power generation duration.

* * * * *